United States Patent

[11] 3,610,381

[72] Inventors Frank H. Mueller;
 John J. Smith; Lynn D. Edwards, all of
 Decatur, Ill.
[21] Appl. No. 30,619
[22] Filed Mar. 31, 1970
[23] Division of Ser. No. 760,006,
 Sept. 16, 1968, Pat. No. 3,541,894
[45] Patented Oct. 5, 1971
[73] Assignee Mueller Co.
 Decatur, Ill.

[54] FEED MECHANISM FOR A DRILLING MACHINE
 4 Claims, 2 Drawing Figs.
[52] U.S. Cl. ............................................. 192/93 R,
 74/89.15, 74/424.8 R, 77/42
[51] Int. Cl. ....................................................... F16d 19/00,
 F16h 1/18, B23b 41/08
[50] Field of Search ........................................... 74/89.15,
 424.8 B, 424.8 R; 192/93 R, 93 B; 77/42

[56] References Cited
 UNITED STATES PATENTS

| | | | |
|---|---|---|---|
| 2,986,959 | 6/1961 | Van Scoy | 77/42 |
| 3,293,952 | 12/1966 | Fairbanks | 77/42 |

*Primary Examiner*—Leonard H. Gerin
*Attorney*—Cushman, Darby and Cushman

ABSTRACT: A drilling machine for tapping a pipe includes a rotatable boring bar which is advanced linearly by a ball bearing nut and screw combination, the nut being fixed to the boring bar and the screw being rotated by a power source. The power source is inactivated when the pipe has been tapped, and the fluid pressure in the main will act on the boring bar tending to force it in a reverse direction thereby tending to rotate the screw rapidly in an uncontrolled manner To prevent this the machine includes a friction brake of special design which automatically restrains reverse rotation of the screw yet is not sufficient to prevent manual reverse rotation of the screw by the operator.

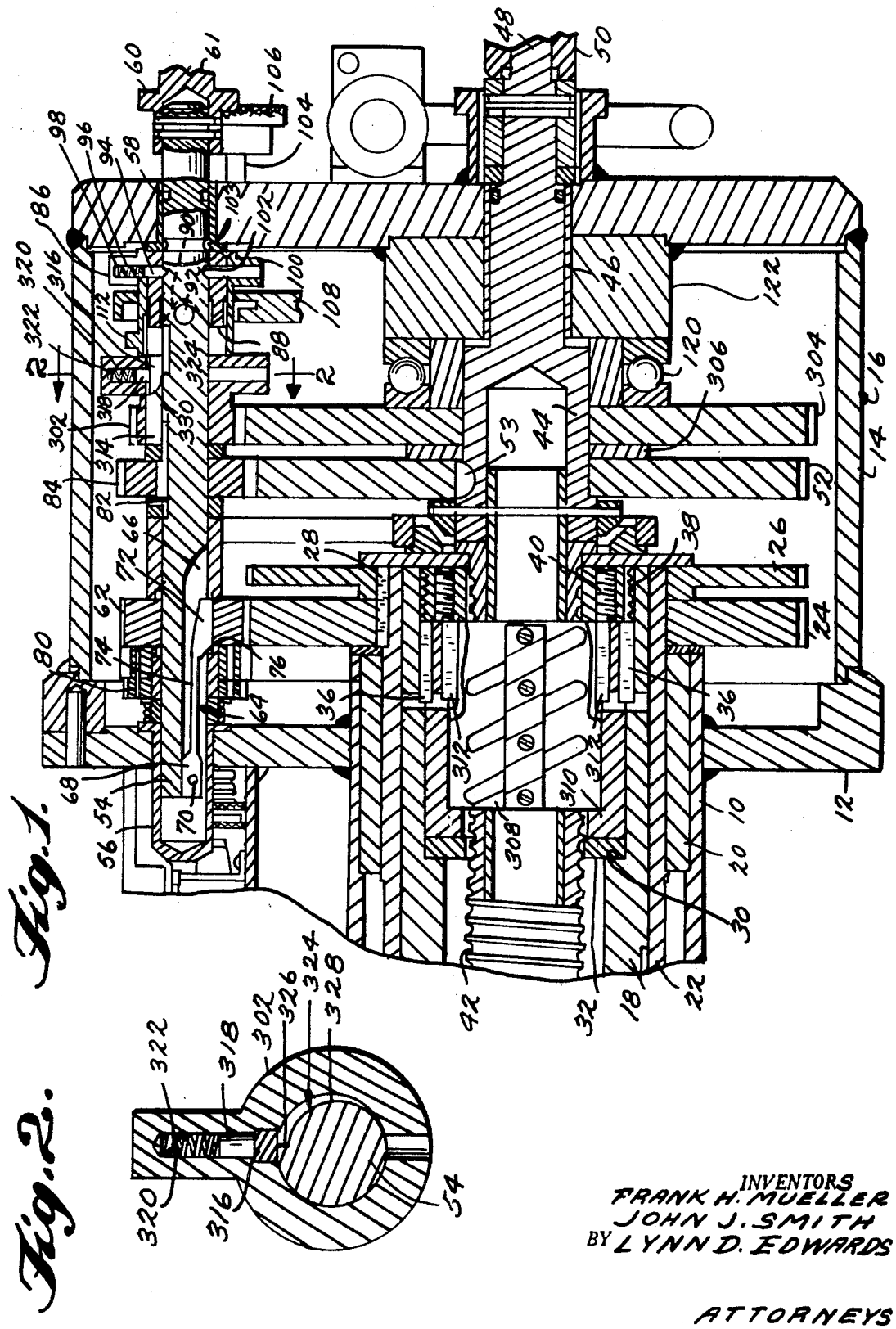

FEED MECHANISM FOR A DRILLING MACHINE

REFERENCE TO RELATED APPLICATION

This application is a division of application Ser. No. 760,006, filed Sept. 16, 1968 now Patent No. 3,541,894.

DESCRIPTION OF THE INVENTION

This invention relates to machines for drilling or tapping high-pressure mains and pipes and more particularly it relates to improvements in a drilling machine of the type which includes a rotatable boring bar and a feed mechanism for advancing or retracting the bar independently of rotation of the latter.

In its broad form the invention defines an improvement in the type of drilling machine in which the linear feed mechanism comprises a nut and screw combination wherein rotation of one of the members produces linear movement of the other member, this movement being transmitted to the boring bar through any suitable connection. The feed mechanism can be operated by hand, or it can be operated with an automatic drive which advances the boring bar, as it rotates, at a rate appropriate for a cutting operation. When the main or pipe has been cut by a tool carried at the outer end of the boring bar, the feed mechanism of the type of machine under consideration is inactivated, as by a clutch operatively connected between the drive motor and the feed screw. At this time the tool and the adjacent end of the boring bar will be subjected to he fluid pressure in the pipe which has been pierced, and this pressure tends to push the boring bar in the opposite, or retract direction. However, actual movement of the bar is prevented by the interaction of the threaded connection which forms part of the feed mechanism.

According to the broad principles of the present invention a ball bearing nut and screw combination is substituted for the more conventional Acme threaded nut and screw in a feed mechanism of this type in order to render the feed and retract action faster and smoother, and at the same time an automatic one-way brake is provided to prevent line pressure from forcing the boring bar in a retract direction at the end of a cut. It will be appreciated that the very low friction in a ball bearing connection between the nut and the screw is insufficient to prevent the boring bar from overhauling very rapidly, when subjected to line pressure. It follows that simple substitution of a ball bearing unit for an Acme thread or the like would permit the feed mechanism to damage itself unless some provision is made for resisting retraction of the boring bar at a time when it is subject to line pressure. The one-way brake provided by the present invention exerts a frictional drag on the rotating element of the feed mechanism at the appropriate time which is just sufficient to prevent back running of the bar, yet which is not sufficient to prevent easy manual rotation of the element to effect controlled retraction of the bar. Preferably the braking force is automatically applied in proportion to the line pressure on the bar.

It is a more specific object of the invention to provide a one-way brake in a drilling machine of the type disclosed in Mueller patents 2,833,167 and 2,925,160. In this kind of machine the automatic drive for the feed mechanism includes a countershaft and differential gearing and a clutch which transmit rotary motion from a motor driven element to the feed screw. The countershaft and the feed screw shaft are permanently geared together, and the boring bar is fixed to the nut which threadedly engages the feed screw. The clutch automatically disengages at the end of a cutting operation, with the result that the aforementioned retraction force on the boring bar due to line pressure is transmitted to the nut-screw connection and would cause the feed screw to run backwards out of control if the nut-screw unit is of the ball bearing type.

The one-way brake of the present invention, as it pertains to this kind of drive mechanism, includes a differential gear arrangement between the counter shaft and the shaft of the feed screw and a friction element such as a thrust washer or the like which resides between the hubs of two of the gears and acts as a friction brake. In the preferred construction a gear is carried on the countershaft, which is parallel to the feed screw, the gear being automatically connectable to the countershaft by a suitable one-way clutch arranged such that the gear rotates freely on the countershaft when the boring bar is being advanced and becomes fixed to the countershaft when the boring bar retracts. An idler gear is freely rotatable on the feed screw shaft and is in continuous mesh with the clutched gear wheel. A thrust washer or the like is carried on the feed screw shaft between the hub of the idler gear and the hub of another gear, the latter being fixed to the shaft and in meshing engagement with a gear fixed to the countershaft. The latter two gears are part of the drive mechanism as disclosed in the aforesaid patents and define a continuous positive drive connection between he countershaft and the feed screw shaft.

When the countershaft begins to rotate due to the aforementioned force of line pressure on the boring bar, the clutched gear becomes locked to the countershaft and begins to rotate the idler gear. A differential effect is built into the gears so that the idler gear tends to rotate at a slower speed than the feed screw shaft. The result is that the thrust washer exerts a frictional force on the drive gear which is just sufficient to prevent back running of the feed screw. The clamping load on the thrust washer is proportional to the line pressure so that the braking force is self-adjusting.

The invention will be further understood from the following detailed description of an illustrative embodiment taken with the drawings in which:

FIG. 1 is a fragmentary longitudinal sectional view of a drilling machine embodying this invention; and FIG. 2 is a sectional view taken on the line 2—2 of FIG. 1.

Referring to FIG. 1, there is shown a portion of a drilling machine in which many of the parts and their cooperation with each other are substantially the same as disclosed in the aforesaid patents 2,833,167 and 2,925,160. The major differences lie in the provision of a ball bearing connection in the feed mechanism for advancing and retracting the boring bar of the machine and in the provision of gears 302 and 304, a thrust washer 306 and various associated parts, all of which will be described in detail hereinafter in conjunction with a general description of the remainder of the machine. At the outset it is sufficient merely to explain that the thrust washer will function as automatic friction brake under certain conditions to prevent driving of the boring bar in a retract direction by the force of line pressure.

The drilling machine includes a barrel 10 provided at one end thereof with a platelike eccentric circumferential flange 12, which, in conjunction with a bowllike top cap 14 bolted thereto, constitutes a gear housing 16. At its other end (not shown) the barrel 10 has secured thereto a driving gear housing (not shown) adapted to be detachably secured to one end of a valve (not shown) through which the boring bar 18 of the machine is adapted to extend for main cutting or drilling operations, all as described more in detail in the aforementioned patent.

Journaled in a bushing 20 in the barrel 10 is the corresponding end of a drive tube 22 which projects into the housing 16 and has a pair of gears secured thereon by a key 28. The other end (not shown) of the tube 22 projects into and is driven from within the aforementioned driving gear housing. Received in the drive tube 22 is the hollow boring bar 18, the upper portion of which has a close sliding fit in the drive tube and is splined thereto for rotation thereby an axial movement relative thereto, preferably by a pair of keys (not shown) secured to the bar and slidable in diametrically opposite interior longitudinal grooves or keyways (not shown) extending the length of the drive tube 22. The upper interior portion of the boring bar 18 is enlarged to provide a shoulder 30 which supports an inwardly overhanging abutment ring 32 against which is seated a ball bearing nut unit which includes a conventional ball bearing nut 308, such as one having a three-lead thread, and a tubular retainer 310 fixed to the nut 308. The retainer 310 is fixed against rotation relative to the boring bar 18 by keys 36, and fixed against rotation relative to the raceway element 308 by keys 312. The entire unit is fixed against axial movement relative to the bar 18 by a retaining ring 38 threaded into the upper end of the bar 18 and locked in place by set screws 40 bearing against the right-hand end of the retainer 310.

A hollow feed screw 42 is engaged within the nut 308 and extends coaxially within the boring bar 18. The right-hand end of the screw 42 has an enlarged, unthreaded extension 44 which extends through the upper gear housing 16 and projects through and is journaled in a sleeve bearing 46 supported by the top cap 14. The projecting outer end of the screw extension 44 terminates in a squared or otherwise noncircularly formed outer end 48 for detachable engagement within the complementary socket of a crank handle 50, only a portion of which is shown. Within the gear housing 16 the screw extension 44 has a gear 52 keyed thereto at 53. The feed nut 308 and the feed screw 42 constitute the feed mechanism of the machine for advancing the boring bar 18 on relative rotation between the nut 308 and the screw 42.

An axially-shiftable countershaft 54 is journaled in a cap bearing 56 mounted in the flange 12 and in a sleeve bearing 58 mounted in the cap 14, in laterally spaced parallel relation to the feed screw 42. At one end the countershaft 54 projects out of the housing 16 and has an operating knob 60 pinned thereto. The end 61 is squared to receive the crank handle 50, the latter being removable from the end 48. Mounted on the countershaft 54 is a gear 62 that is selectively connectable and disconnectable with the countershaft for rotation therewith or relative thereto by means of a dive-key type of clutch mechanism. This clutch mechanism includes a spring key 64 received with sliding clearance in a longitudinally extending slot 66 in the countershaft 54. The base or foot portion 68 of the key is secured in the slot by a transverse pin 70, while the head 72 of the key is urged by its spring shank 74 to project out of the slot 66 for engagement within a longitudinal groove 76 in the interior of the hub of the gear 62. The key 64 is engaged and disengaged with the gear 62 by axial movement of the countershaft 54, which may be shifted manually by the knob 60. Thus, when the countershaft 54 is in the axial position shown in FIG. 1, the key 64 projects into the groove 76 in the gear 62 so as to lock the latter to the countershaft for rotation therewith. When the countershaft 54 is shifted to the left, however, an angular face on the key 64 bears against the edge of an aperture in a bushing 80 on the shaft 54 and cams the key head 72 back into the clot 66 and out of engagement with the gear 62 so that the latter can rotate relative to the countershaft.

Also mounted on the countershaft 54, by a key 82, is a gear 84. The gears 24 and 62 are in constant mesh while the gears 52 and 84 are in constant mesh. Consequently, when the clutch mechanism is engaged, the gears 24 and 62, the countershaft 54, and the gears 82 and 52 form a power train that constitutes an automatic drive for the feed mechanism. The ratios of the gears in the automatic drive are such that when the clutch mechanism is engaged, rotation of the drive tube 22 drives the feed screw 42 at a slightly greater rate of rotation than the feed nut 308 to thereby advance the boring bar 18 at an appropriate rate for cutting a main. When the aforedescribed clutch mechanism is disengaged, manual rotation of the feed screw 42, by the crank handle 50, when the drive tube 22 and the nut 308 are at rest, rotates the feed screw 42 at a rate fast enough to rather rapidly thread the nut therealong for a fast advance or retraction of the boring bar 18.

The machine also embodies a preset feed mechanism which can be adjusted so that when the machine is in automatic feed and the boring bar 18 advances a predetermined distance from any axial position of such bar, the automatic drive will be disengaged and stop further advance of the boring bar. For this purpose, the preset feed mechanism includes means for shifting the countershaft 54 from its automatic feed to its hand feed position, i.e., from its clutch-engaged to its clutch-disengaged position. This shifting means includes a cam sleeve 86, shown formed in two parts welded together for manufacturing convenience, which is journaled on the countershaft 54. One end of the sleeve 86 is formed with what may be termed a counterbore that forms a shoulder 88 provided with diametrically opposite, V-shaped cam grooves 90 within which ride the opposite ends of a pin or cam follower 92, extending diametrically through the countershaft 54, when the latter is in its automatic feed position.

It will be seen that if the cam sleeve 86 is restrained against rotation and the countershaft 54 continues to rotate, the projecting ends of the cam pin 92 will ride up the inclined sidewalls or surfaces of the cam grooves 90 and force the countershaft 54 to shift to the left from its automatic feed to its hand feed position. In such latter position of the countershaft 54, the projecting ends of the cam pin 92 clear the shoulder 88 in the cam sleeve 86 so that the countershaft can rotate freely relative to the cam sleeve and enable operation of the manual feed.

The countershaft 54 is yieldably retained in its automatic feed position by a detent 94 slidable in a radial interior blind socket 96 in the cam sleeve 86 and urged inwardly by a spring 98 interposed between the detent and the base of the socket. It will be noted that the sleeve 86 is provided with a radial bore 100 aligned with the socket 96 so that the spring 98 and detent 94 can be passed through the bore 100 and into the socket in assembling the detent elements with the cam sleeve. The detent 94 has a rounded nose engageable within one or the other of a pair of diametrically opposite circular recesses 102 and 103 in the countershaft 54.

When the detent 94 is engaged with one of the recesses 102, 103 in the countershaft 54, not only is the latter yieldably retained in its automatic feed position, but also the projecting ends of the pin 92 are yieldably maintained out of engagement with the sides of the cam grooves 90, as shown in FIG. 1. Consequently, when the cam sleeve 86 is rotating with the shaft 54, no camming action between the pin 92 and the sides of the cam grooves 90 can occur because of hammering action therebetween occasioned by vibratory conditions, because of the out-of-engagement relationship between these parts yieldably maintained by the detent 94 and one of its corresponding recesses 102, 103 in the countershaft 54.

The mechanism for arresting rotation of the cam sleeve 86 constitutes a part of the aforementioned preset feed mechanism that is driven by the gear 26 and which is settable by a rotatable and axially shiftable shaft 104 one end of which projects out of the housing 16 and has a knurled operating knob 106 secured thereon. The details of the preset feed mechanism are described in the aforementioned patents and form no part of the present invention. It is sufficient for the purposes here to point out that the preset feed mechanism includes an arm 108 having an aperture therein rotatably receiving a portion of the cam sleeve 86, and which arm is automatically movable by operation of the preset feed mechanism to the left from the position shown in FIG. 1. A counterbore at one end of the aperture in the arm 108 is provided with a radial stop lug engageable with a radial lug 112 on and adjacent one end of the cam sleeve 86, when the arm 108 is shifted to the left automatically by the preset feed mechanism, to arrest or prevent rotation of the cam sleeve.

As previously described, such arrestment will automatically shift the countershaft 54 from automatic to hand feed position.

Referring again to the one-way brake arrangement which forms an important part of the present invention it is explained that the gear 302 is provided with a one-way clutch arrangement such that it is locked to the countershaft 54 when the latter rotates in a direction corresponding to retraction of the boring bar 18 and is otherwise freely rotatable relative to the countershaft 54. To this end the gear 302 is provided with a keyway 314 and a key 316, the latter having a projection 318 which is loosely retained in a socket 320 in the gear. A spring 322 urges the key 316 downwardly so that it rides on the surface of the countershaft 54 when the latter is in the automatic drive position shown in FIG. 1.

When the countershaft 54 s shifted to the left by the feed setting mechanism or by hand, the key 316 is urged by the spring 322 into a groove 324 in the countershaft 54. As seen in FIG. 2 one wall 326 of the groove 324 is generally radial so that the key 316 will lock against this wall when the countershaft 54 turns clockwise. The other wall 328 is inclined so that the key 316 will slide over it, ratchetlike, when the countershaft 54 turns counterclockwise. When the countershaft 54 is shifted again to the right, the key 316 is cammed upwardly against the action of the spring 322 by engagement of the arcuate end 330 of the key 316 with the edge of the keyway 324.

The gear 304 is an idler gear which is freely rotatable on the shaft extension of the feed screw 42 and which engages a thrust bearing 120 interposed between the gear 304 and a fixed thrust collar 122. The thrust washer 306 is also freely rotatable on the shaft extension and is in contact with the hub portions of the idler gear 304 and the gear 52. When the countershaft 54 is in the right-hand position, as shown, the gears 304 and 52 and the thrust washer turn as a unit, because the gear 302 turns freely on the countershaft 54. However, when the key 316 enters the keyway 324 due to movement of the countershaft 54 to the left, the gear 302 becomes a driven gear upon rotation of the countershaft 54 in a direction corresponding to retraction of the boring bar 18. The gears 52, 84, 302, and 304 are constructed with a differential effect such that the idler gear, when driven, turns at a slower rate than the gear 52. The thrust washer 306 therefore acts as a friction brake against the gears 52 and 304 when the boring bar 18 retracts or tends to retract.

Referring more specifically to the operation of the machine just prior to operation of the brake arrangement it will be recalled that the countershaft 54 is automatically shifted to the left when the boring bar 18 has advanced to the position previously set by an operator on the feed set mechanism (not shown). The shifting movement occurs as a result of the arresting of rotation of the cam sleeve 86 and consequent engagement of the pin 92 with the cam grooves 90. As previously described, the set mechanism (not shown) arrests rotation of the cam sleeve 86 by moving the arm 108 into engagement with the lug 112 on the cam sleeve 86. Shifting of the countershaft 54 to the left disconnects the rotative drive between the power driven drive tube 22 and the countershaft 54 by camming the spring key 64 out of engagement with the gear 62. The key 82 between the gear 84 and the countershaft 54 permits the latter to move axially with respect to the gear 84, so that the gears 84 and 52 remain in meshing engagement. Shifting of the countershaft 54 to the left also brings into operation the one-way clutch arrangement between the countershaft 54 and the gear 302.

Once the rotative drive between the drive tube 22 and the countershaft 54 becomes disconnected, as just described, the feed screw 42 is subjected to a rotative force in the opposite, or retract direction due to the pressure of the fluid in the perforated pipe or main acting on the boring bar and being converted to torque by the ball bearing nut 308. The torque may be quite high, inasmuch as the pressure in the line may exceed 1000 pounds per square inch. This torque is transmitted from the feed screw extension to the countershaft 54 by the gears 52 and 84, and then to the idler gear 304 by means of the clutched gear 302. The differential action of the gears 52, 84, 302 and 304 tends to rotate the gear 304 more slowly than the gear 52 so that frictional forces are generated between the faces of the thrust washer 306 and the hubs of the gears 304 and 52.

The frictional forces are proportional to the fluid pressure acting on the boring bar 18 due to the tendency of the feed screw to move to the right and to thereby clamp the washer 306 between the gears 304 and 52. The design is such that the friction is slightly more than sufficient to prevent rotation of the feed screw 42 by the line pressure alone yet is low enough to be easily overcome by manual rotation of either the countershaft 54 or the feed screw extension in a retract direction. In this regard it will be understood that the braking action will depend in large part on the diameter and material of the washer 306, on the speed differential effect of the gears and on the tightness of the gears against the washer and that many variations in these parts may be employed to obtain the desired results.

It will be appreciated that the one-way brake arrangement will function also in the event that, for some reason, it is necessary to stop the drilling operation and withdraw the boring bar 18 before the cutting operation has been completed, as when a pilot drill breaks. In this case, the countershaft 54 is first shifted manually to the left by pushing on the knob 60, and the braking action of the thrust washer 306 occurs in fluid manner described above. Then, when it is desired to advance the boring bar 18 against line pressure, the hand crank 50 will be placed over the end 61 of the countershaft 54 and turned in the appropriate direction so as to take advantage of the gear reduction between the gears 84 and 52. Under these conditions the gear 302 is declutched from the countershaft 54, and the gears 52 and 304 turn together on the bearing 120, removing the frictional load of the brake.

When initially installing the machine on a pipe, the boring bar 18 can be advanced rapidly to its desired position by using the hand crank 50 on the end 48 of the feed screw extension. There is no pressure load on the boring bar 18 at this time, and rapid manual advance is obtained due to the ease with which the feed screw 42 may be turned in the ball bearing nut 308. The brake is, of course, inoperative due to declutching of the gear 302 from the countershaft 54.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

1. A power train comprising: a translatable element; a rotary element; a drive connection between said elements operable to convert rotary motion of said rotary element to linear movement of said translatable element and operable to convert linear movement of said translatable element to rotary motion of said rotary element; a drive connection operatively connected with said rotary element for imparting rotary motion thereto in one direction from a rotary power source to urge said translatable element in one direction, said drive connection including engageable and disengageable clutch means for rendering said connection operative and inoperative, engageable and disengageable brake means operative when said clutch means is disengaged to apply to restraining force to said rotary element to resist yet not prevent rotation thereof in a direction reverse to said one direction thereby preventing uncontrolled reverse rotation of said rotary element as a result of external linear forces applied to said translatable element in said reverse direction when said clutch means is disengaged.

2. A drive train as in claim 1 wherein said brake means includes a friction element having a surface facing in said one direction and engaging an oppositely facing surface on a part fixedly carried by said rotary element whereby the friction between said surfaces is proportional to said external linear forces applied to said translatable element.

3. A drive train as in claim 2 wherein said friction element is freely mounted on said rotary element for rotation relative thereto and wherein said brake means further includes a hub member freely mounted on said rotary element for rotation relative thereto, said hub member engaging the surface of said friction element opposite said first-mentioned surface, and drive means operatively connected with said rotary element and with said hub member for rotating the latter in a different mode from said rotary element when the latter turns in said reverse direction to thereby create frictional forces against said part which is fixedly carried by said rotary element.

4. A drive train as in claim 3 wherein said drive means for rotating said hub member includes a countershaft disposed parallel to said rotary element, a continuously engaged gear connection between said rotary element and said countershaft, a gear connection including a one-way clutch between said countershaft and said hub member and operable to rotate the latter only when said rotary member turns in said reverse direction.